United States Patent [19]

Okabe

[11] Patent Number: 5,025,475

[45] Date of Patent: Jun. 18, 1991

[54] PROCESSING MACHINE

[75] Inventor: Yoshie Okabe, Yokohama, Japan

[73] Assignee: Kabushiki Kaisha Toshiba, Kanagawa, Japan

[21] Appl. No.: 159,927

[22] Filed: Feb. 24, 1988

[30] Foreign Application Priority Data

Feb. 24, 1987 [JP] Japan .................................. 62-39207

[51] Int. Cl.[5] ............................................ G06K 9/00

[52] U.S. Cl. ........................................ 382/1; 382/48; 382/10; 382/9

[58] Field of Search ..................... 382/1, 9, 10, 48, 61; 235/435; 209/584, 900

[56] References Cited

U.S. PATENT DOCUMENTS

| | | | |
|---|---|---|---|
| 3,432,032 | 3/1969 | Curphey et al. | 209/73 |
| 3,983,366 | 9/1976 | Gunn | 235/435 |
| 4,034,341 | 7/1977 | Isono et al. | 382/1 |
| 4,158,835 | 6/1979 | Miura et al. | 209/900 |
| 4,475,234 | 10/1984 | Nishijima et al. | 382/1 |
| 4,516,264 | 5/1985 | Corvari et al. | 382/46 |
| 4,520,932 | 6/1985 | Matsuda et al. | 209/545 |
| 4,632,252 | 12/1986 | Haruki et al. | 209/584 |
| 4,736,441 | 4/1988 | Hirose et al. | 382/48 |
| 4,783,825 | 11/1988 | Hirose et al. | 382/1 |
| 4,845,761 | 7/1989 | Cate et al. | 382/1 |
| 4,868,570 | 8/1989 | Davis | 209/584 |

FOREIGN PATENT DOCUMENTS

| | | |
|---|---|---|
| 0076332 | 4/1983 | European Pat. Off. . |
| 0085567 | 8/1983 | European Pat. Off. . |

OTHER PUBLICATIONS

Development of Bi-Functional OCR, by Sugita et al., published in Jan. 1981.

Japanese Patent Application Laid-Open No. P61-272891 (abstract).

*Primary Examiner*—David K. Moore
*Assistant Examiner*—Jose L. Couso
*Attorney, Agent, or Firm*—Finnegan, Henderson, Farabow, Garrett, and Dunner

[57] ABSTRACT

To determine whether mail address characters are printed or handwritten by a single recognizer (OCR) in a mail processing machine, the front surface of a piece of mail is determined by the presence of a postage stamp, an address window, an address label or by comparing the character areas of both surfaces of the piece of mail. Further, when no stamp and no address window/label are attached, the mail address character area is detected by compressing and binarizing the entire front surface image signals. Thereafter, only the address character image signals corresponding to the detected address window/label or mail address character area are processed through the recognizer.

6 Claims, 5 Drawing Sheets

PROCESSING MACHINE

BACKGROUND OF THE INVENTION

1. Field of the Invention

The present invention relates to a mail processing machine (face-canceller) which can arrange mail, cancel postage stamps, and sort mail according to whether the address is written in print or is written in handwriting.

The mail determined to have address characters written in print is further sorted with respect to zip codes by a zip code reader, while the mail determined to have address characters written in handwriting is further sorted with respect to zip codes by human labor.

2. Description of the Background Art

There exist mail processing machines for facing mail, discriminating whether the characters are written in print or in handwriting, cancelling stamps, and sorting the mail according to printed mail and handwritten mail. In this conventional mail processing machine, however, since the two entire surfaces of a mail are scanned by two optical character readers (OCRs) to discriminate printed mail from handwritten mail or vice versa, there exist some problems in that the cost of the OCRs is high and the processing time is relatively long. This is because when the front surface or the back surface of a piece of mail is not determined because of the absence of a postage stamp, the mail characters must be read and discriminated on both the surfaces of the mail.

SUMMARY OF THE INVENTION

With these problems in mind, therefore, it is the primary object of the present invention to provide a mail processing machine provided with a single recognizer (OCR).

To achieve the above-mentioned object, a mail processing machine according to the present invention comprises: (a) means for feeding a piece of mail having first and second surfaces; (b) first detecting means for detecting the presence of an address on the first surface of the piece of mail; (c) second detecting means for detecting the presence of an address on the second surface of the piece of mail: (d) means for determining a front side of the piece of mail on which the address is detected to be present; (e) third detecting means for detecting an address on the first surface of the piece of mail, when the first surface is determined as the front side; (f) fourth detecting means for detecting an address on the second surface of the piece of mail, when the second surface is determined as the front side; (g) means for recognizing content of the address detected by one of the third and the fourth detecting means.

BRIEF DESCRIPTION OF THE DRAWINGS

The features and advantages of the mail processing machine according to the present invention will be more clearly appreciated from the following description of the preferred embodiment of the invention taken in conjunction with the accompanying drawings in which like reference numerals designate the same or similar elements or sections throughout the figures thereof and in which.

DETAILED DESCRIPTION OF THE PREFERRED EMBODIMENTS

A mail address processing machine which constitutes an embodiment of the present invention will be described hereinbelow with reference to the attached drawings.

Figure 2A:
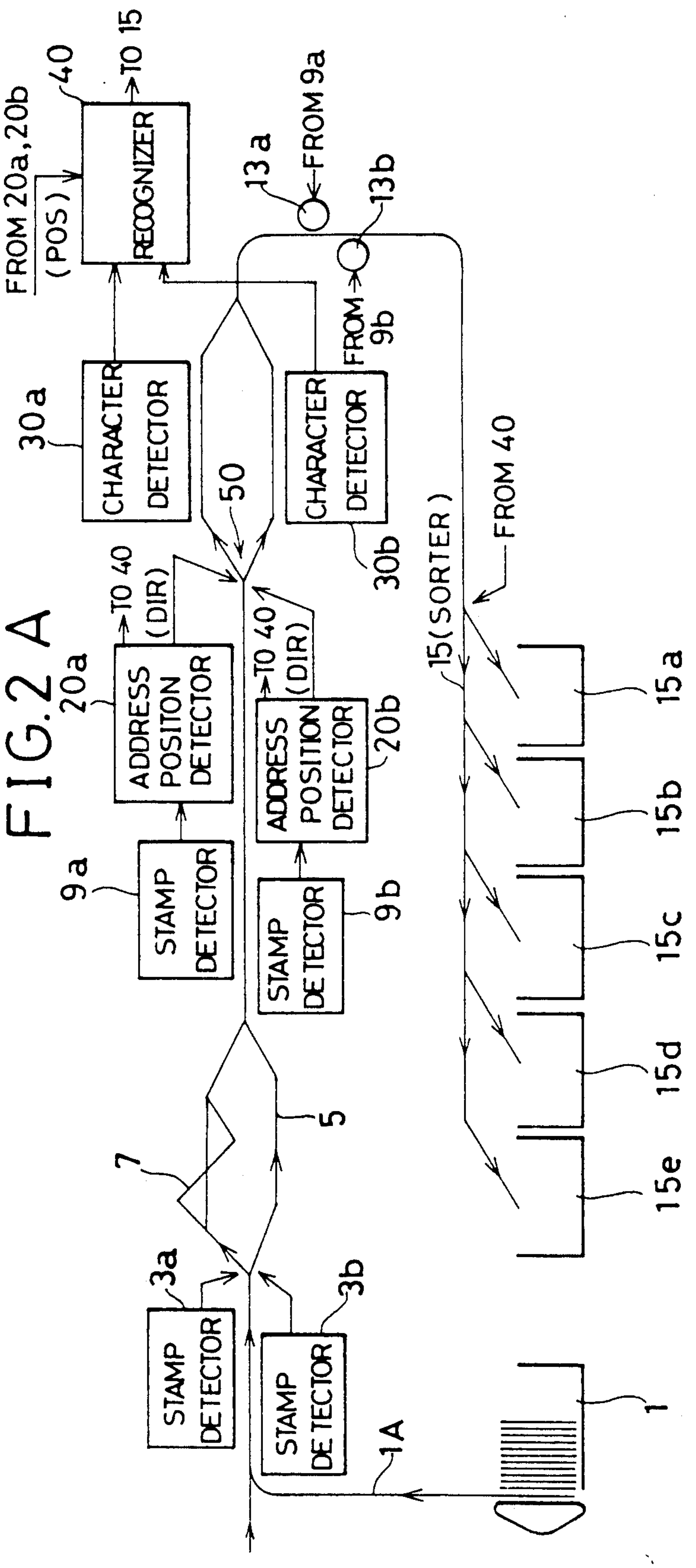
FIG. 2A is a diagrammatical view showing a mail processing machine which constitutes an embodiment of the present invention.

In FIG. 2A, the mail processing machine reads a Zip code and an address written on a piece of mail, discriminates whether the address characters are written in print or in handwriting, cancels stamps, and sorts the mail into two groups: printed address mail and handwritten address mail. A first group of mail sorted as print writing is further sorted automatically by a Zip code reader; while a second group of mail sorted as handwriting is further sorted by manual operation according to Zip codes.

Figure 2B:
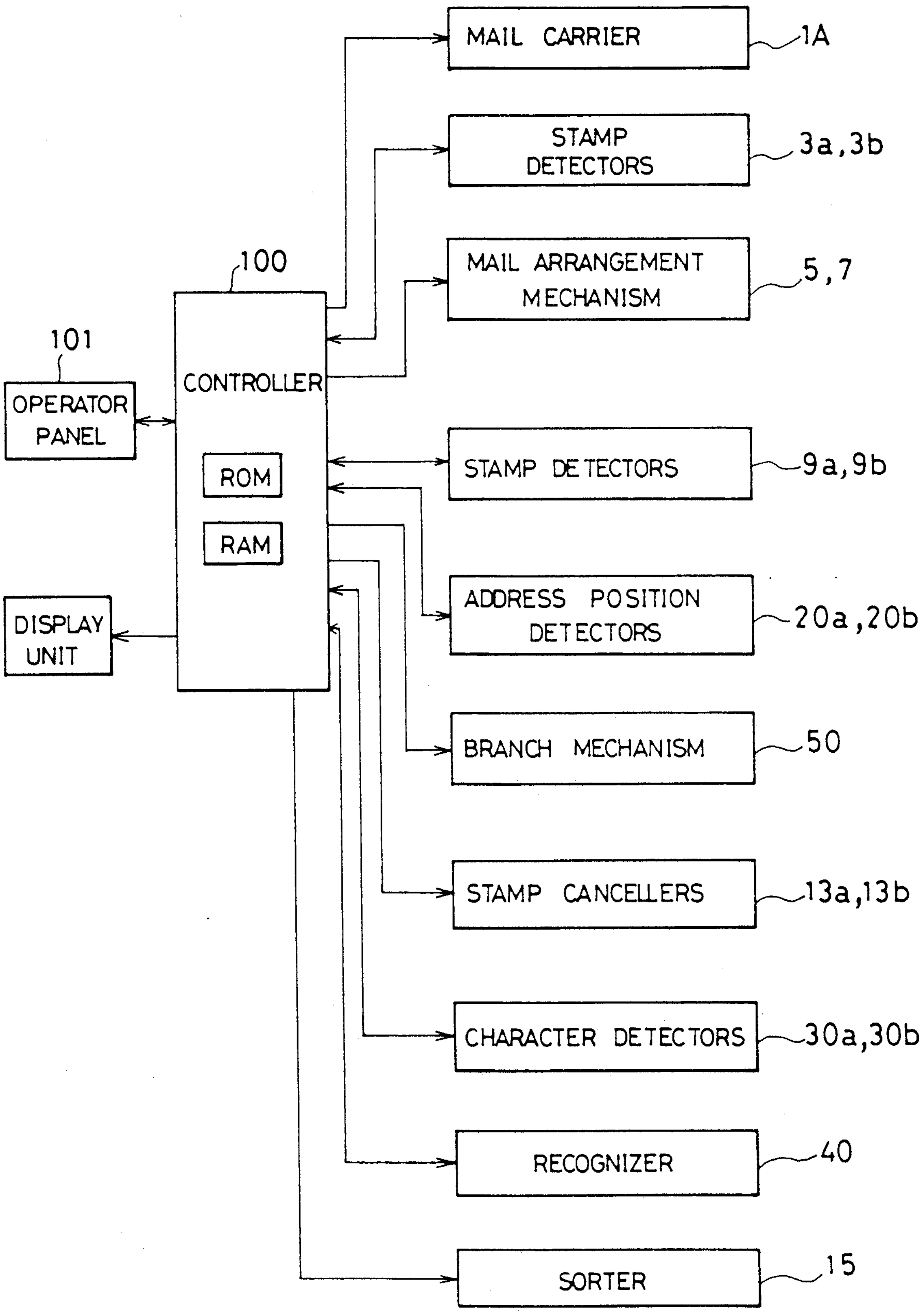
FIG. 2B is a block diagram showing the mail processing machine shown in FIG. 2A.

The mail processing machine shown in FIGS. 2A and 2B comprises an operator panel 101, a controller 100, a mail box 1, a mail carrier 1A, two stamp detectors 3*a* and 3*b*, a non-inversion path 5 and an inversion path 7 (mail arrangement mechanism), two stamp detectors 9*a* and 9*b*, two address position detectors 20*a* and 20*b*, a branch mechanism 50, two character detectors 30*a* and 30*b*, a recognizer 40, two stamp cancellers 13*a* and 13*b*, and a sorter 15 including plural mail sorting boxes 15*a* to 15*e*.

Figure 1:
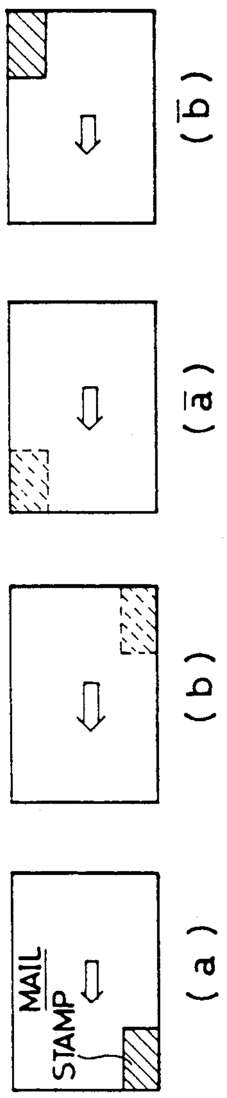
FIG. 1 is an illustration for assistance in explaining four situations of mail fed through the mail processing machine.

In more detail with reference to FIG. 2A, a batch of mail is arranged in a mail box 1. Each piece of mail arranged in the mail box 1 is fed one by one to two (postage) stamp detectors 3*a* and 3*b* in a vertical mail position. In this case, when a postage stamp is attached to a corner of a mail as shown by (a) in FIG. 1, four different positions (a), (b), ($\bar{a}$) and ($\bar{b}$) can be considered as depicted in FIG. 1, in which solid lines of a stamp indicate that a stamp is attached on the front surface side of a mail and dashed lines thereof indicate that a stamp is attached on the back surface side of a piece of mail. Here, the two stamp detectors 3*a* and 3*b* are so arranged as to detect the stamp only when the stamp is located at the lower ends of the mail as depicted by (a) and (b) in FIG. 1, respectively. That is, the stamp attached as (a) in FIG. 1 can be detected by the stamp detector 3*a*, and that attached as (b) in FIG. 1 can be detected by the stamp detector 3*b*. When these two detectors 3*a* and 3*b* detect the presence of a stamp, the mail is fed through a non-inversion path 5. However, when these two detectors 3*a* and 3*b* cannot detect the presence of a stamp or when the stamp is located at the upper ends of the mail as depicted by ($\bar{a}$) and ($\bar{b}$) in FIG. 1, respectively, the mail is fed through an inversion path 7 to reverse the mail to be upside down so that the mail is always located as shown by (a) and (b) in FIG. 1. In more detail, when the stamp is located as ($\bar{a}$) and reversed, the stamp is located as (a); when stamp is located as ($\bar{b}$) and reversed, the stamp is located as (b) in FIG. 1.

The piece of mail so arranged that the stamp is located on the lower side thereof is then fed to the next two stamp detectors 9*a* and 9*b* to detect the presence or absence of the stamp. Therefore, when the stamp detector 9*a* or 9*b* detects the presence of stamp, it is possible to determine that the address is written on the side on which at least one stamp is stuck.

The address position detector 20*a* or 20*b* detects the address character position and the front surface of a mail on which an address is written on the basis of mail surface information. That is, when the presence of stamp is detected by the stamp detector 9*a* or 9*b*, the address position detector 20*a* or 20*b* next detects the presence of an address window covered by cellophane or an address label on which an address is written in order to detect a piece of mail address character position. When the presence of a stamp is not detected by the two stamp detectors 9*a* and 9*b*, the quantity of characters or the extent of characters written on one surface of the mail is compared with that on the other surface of the same piece of mail by the two address position detectors 20*a* and 20*b* in order to determine the front surface or the back surface of the piece of mail. That is, the surface on which many characters are written is determined as the front surface of the mail.

On the basis of the above detected window or label position and the quantity of characters, it is possible to detect the front side or the back side of the mail and the address position or area where an address is written. In other words, even when the stamp detector 9*a* or 9*b* cannot detect the presence of a postage stamp, the front surface of the mail is determined on the basis of the address window, the address label, or the quantity of characters detected by the address position detector 20*a* or 20*b*. The quantity of the address characters can be determinled by integrating the image signals indicative of address characters.

When the address position detector 20*a* detects the front of a piece of mail, the branch mechanism 50 is actuated so that the piece of mail is fed to the character detector 30*a*. On the other hand, when the address position detector 20*b* detects the front of a piece of mail, the branch mechanism 50 is actuated so that the piece of mail is fed to the character detector 30*b*.

Figure 3A:
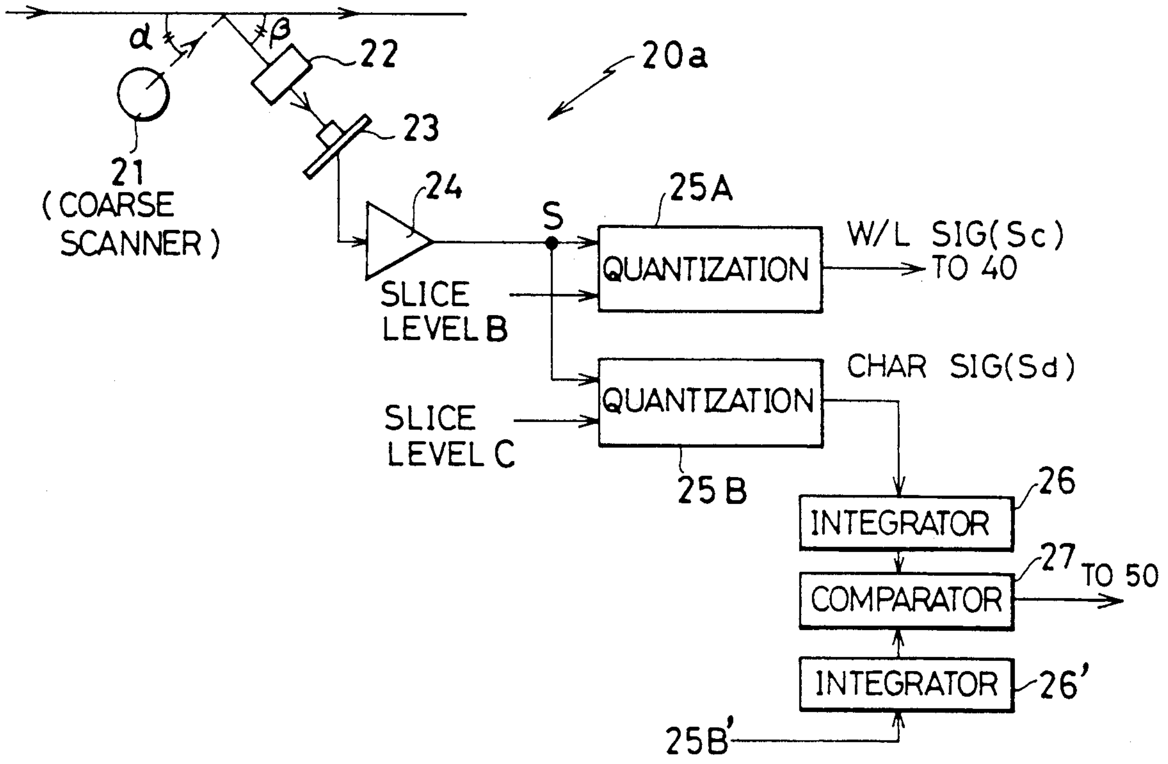
FIG. 3A is a block diagram showing an address position detector shown in FIG. 2.
Figure 3B:
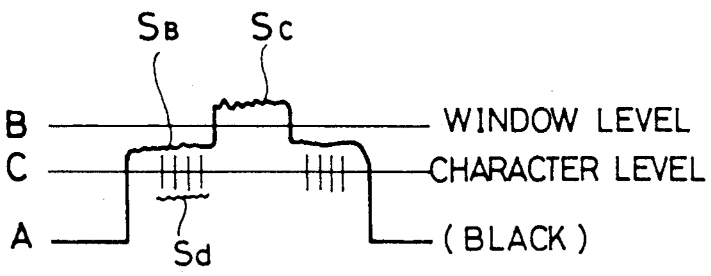
FIG. 3B is a graphical representation showing signal level of surface information detected by the address position detector shown in FIG. 2.

In more detail, with reference to FIG. 3A, the address position detector 20*a* or 20*b* comprises a light source 21 for emitting a light beam toward a piece of mail fed through a carrying path for scanning, a lens 22 for focusing the light reflected from the mail, a photosensitive element 23 composed of a line image sensor (e.g. charge coupled devices) for detecting characters written on the piece of the mail, an amplifier 24 for amplifying the detected character image signal S, and two quantization circuits 25A and 25B. The light source 21 and the lens 22 are both disposed relative to the mail in such a way the an incidence angle $\alpha$ is roughly equal to a reflection angle $\beta$. The quantization circuit 25A compares the image signal S detected by the photosensitive element 23 with a slice level B outputted from a controller (not shown), and outputs a window/label signal (W/L SIG) indicative of the presence of a window or label of a high reflectivity, when the level of the image signal S exceeds the slice level B as shown by $S_C$ in FIG. 3B. On the other hand, the quantization circuit 25B compares the image signal S with a slice level C also outputted from a controller (not shown) and outputs a paper surface signal $S_B$ indicative of the absence of characters of a middle reflectivity, when the level of the image signal S lies between the slice levels B and C. Further, when the two quantization circuits 25A and 25B generate no quantized signal, the signal $S_d$ is determined as a character signal (CHR SIG) indicative of the presence of characters of a low reflectivity. Further, in FIG. 3B, the level A of the image signal S is detected when the mail surface is deep black.

In the address position detector 20*a* or 20*b*, the resolving power of scanning is not high (e.g. a single scanning line per millimeter) because this detector detects only the position of an address window/label. The window/label position can be detected in the form of (x, y) coordinates indicative of the number of the horizontal scanning line from an upper edge and a time period from an edge of the horizontal scanning line, for instance.

When no postage stamp and no address window/label are detected, the character signal $S_d$ outputted from the quantization circuit 25B is integrated by an integrator 26 and supplied to a comparator 27. On the another hand, other character signal $S_d'$ outputted from another quantization circuit 25B' of the address position detector 20*b* is integrated by an integrator 26' and supplied to the comparator 27. The comparator 27 compares these two integrated character signals to determine the front side of a piece mail. For instance, if the character signals integrated by the integrator 26 are large, the comparator 27 generates a command signal to the branch mechanism 50 to feed the mail toward the character detector 30*a*. In response to this command signal, character detector 30*a* is activated to detect the character images.

Figure 4:
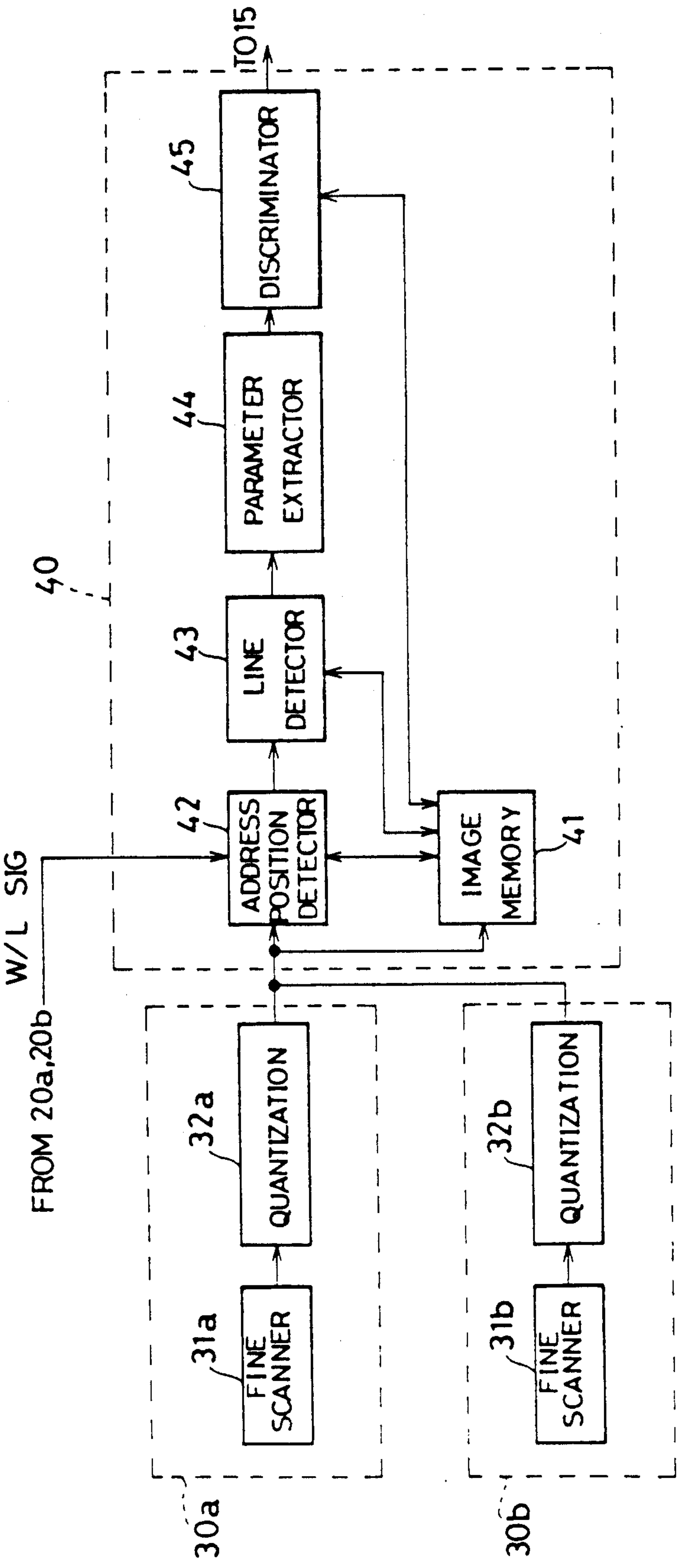
FIG. 4 is a block diagram showing character detectors and a recognizer both shown in FIG. 2.

FIG. 4 shows the two character detectors 30*a* and 30*b* and the recognizer 40. Each character detector 30*a* or 30*b* comprises a fine scanner 31*a* or 31*b* and a quantization circuit 32*a* or 32*b*. The fine scanner 31*a* or 31*b* generates image signals in almost the same way as in the address position detector 20*a* or 20*b* by irradiating the mail surface with a light beam and transducing the reflected light beam by photosensitive elements into image signals. However, the resolving power of the fine scanner 31*a* or 31*b* is as high as 8 lines per millimeter because this detector detects the features of characters.

The quantization circuit 32*a* or 32*b* compares the detected mail surface image signals with a predetermined slice level and outputs character image signals only when the image signal drops below a slice level (the above processing being referred to as binarization).

The recognizer 40 comprises an image memory 41, an address position detector 42, a line detector 43, a parameter extractor 44, and a discriminator 45.

The image memory 41 stores all the scanned and binarized character image signals detected by either one of the character detector 30*a* or 30*b*. This is because the front surface of a piece of mail has already been detected by the address position detectors 20*a* and 20*b*, and the detected mail is fed to any one of the character detectors 30*a* and 30*b*. Therefore, the image memory 41 stores the character image signals corresponding to the detected front surface of a piece of mail and detected by any one of the character detectors 30*a* and 30*b*.

The character line detector 43 functions as follows: The preceding processings have already detected an address position or area where an address is written. Therefore, in this step, character lines are further detected from the detected address area. That is, since an area where characters are gathered has already been determined, the succeeding step determines how the characters are arranged within the detected address area.

For doing this, the number of character image signals are counted along the direction perpendicular to the character lines in order to obtain a histogram. By detecting the peaks of the histogram indicative of the distribution of the character image signals, it is possible to detect the number of lines. As to the above-mentioned character line detection, if should be noted that the scanning operation is as fine as 8 lines per millimeter, for instance, as compared with the coarse scanning operation (e.g. 1 line per millimeter) of the address position detector 20*a* or 20*b*.

The parameter extractor 44 detects character feature parameters. These parameters are dispersions of various character features such as (1) character height; (2) character lower edge position; (3) character width; (4) character pitch; (5) character area; (6) line arrangement slope; (7) leftmost character position; (8) line space, etc.

To obtain character feature parameters, a reference threshold value $\delta_0^2$ of each of the dispersions of the character features is previously determined. Each actual dispersion value $\delta^2$ obtained by calculating image signals read from the image memory 41 is compared with this reference threshold value $\delta_0^2$. The compared result (the difference between the actual dispersion and the reference dispersion) is stored in the image memory 41 and added in sequence to obtain a sum total of the differences between the two of the above-mentioned eight character features. When the discriminator 45 determines that the sum total of the dispersion differences between the actual values and the reference values exceeds a predetermined value, the characters are discriminated as being handwritten. In contrast with this, when the discriminator 45 determines that the sum total of the dispersion differences is less than the predetermined value, the characters are discriminated as being printed.

Figure 5:
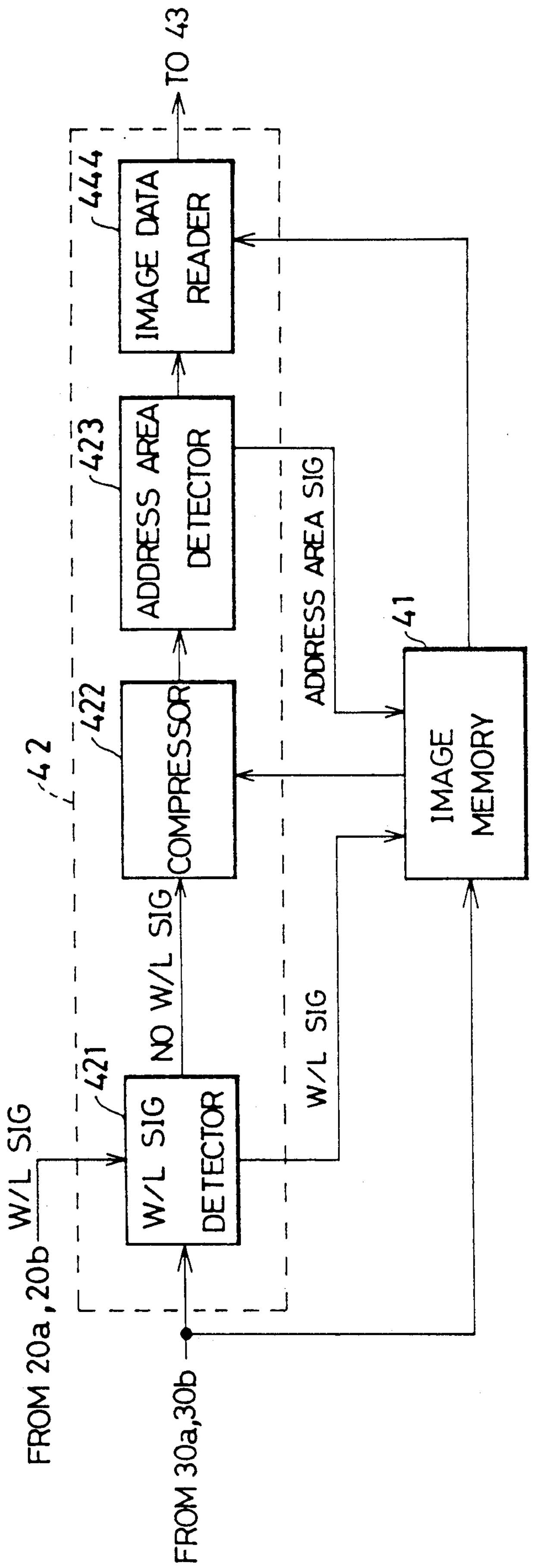
FIG. 5 is a block diagram showing an address position detector shown in FIG. 4.

FIG. 5 is a block diagram showing the address position detector 42, which comprises a W/L signal detector 421, a compressor 422, an address area detector 423 and an image data reader 444.

When the W/L signal detector 421 detects a presence of a W/L signal indicative of a window/label position (x-y coordinates), the image data reader 444 reads image data corresponding to only the window/label position from the image memory 41.

When the W/L signal detector 421 detects an absence of W/L signal, the compressor 422 reads the entire image signals from the image memory 41 for compression. For instance, the resolving power of the image signals is reduced from 8 lines per mm to 1 line per mm by simply averaging the eight horizontal scanning line signal levels. levels. The address area detector 423 compares averaged signal levels with a slice level for binarization, and determines an address character area on the basis of the binarized character image signals collected at an area on the front surface of the piece of mail. When this address character area has been detected, the image data reader 444 reads image data corresponding to only the determined address character area.

When the stamp detector 9*a* or 9*b* detects the presence of a postage stamp on the piece of mail, a stamp canceller 13*a* or 13*b* corresponding to the stamp detector 9*a* and 9*b* impresses a mark on the detected postage stamp. The piece of mail thus detected are sorted and put into five sorting boxes 15*a* to 15*e*, in such a way that mail having an address written in print and detected by the character detector 30*a* are arranged in the box 15*a*; mail having an address written in handwriting and detected by the character detector 30*a* are arranged in the box 15*b*; mail having an address written in print and detected by the character detector 30*b* are arranged in the box 15*c*; mail having an address written in handwriting and detected by the character detector 30*b* are arranged in the box 15*d*; and other mail determined to be rejected are arranged in the box 15*e*.

In the conventional machine, when no stamp is detected, it is necessary to entirely scan both the surfaces of the piece of mail by two optical character readers. Further, even if a stamp is detected, it is necessary to scan the entire surface of the front of the piece of mail, so that the mail processing speed is relatively low. In the machine of the present invention, it should be noted that since the address position detector 20*a* or 20*b* can detect a window/label position and the front side of the piece of mail (by comparing the quantity of characters) and further the address position detector 42 can determine an address character area, character images corresponding to only the front surface of the piece of mail and only the address position (window or label) or address character area can be read from the image memory 41 for discrimination. Therefore, character image data to be discriminated are not large, so that it is possible to increase the mail processing speed and therefore decrease the cost of the machine by providing only a single recognizer 40 including the discriminator 45.

The operation of the mail processing machine constituting an embodiment of the present invention will be described hereinbelow.

The pieces of mail are arranged in the mail box 1 and fed one by one to the stamp detectors 3*a* and 3*b* via a path 1A in a vertically arranged position. When the stamp detector 3*a* or 3*b* detects the presence of a stamp attached to the lower side end of the piece of mail, for instance, the mail is fed through the non-inversion path 5. When the stamp detector 3*a* or 3*b* detects the absence of a stamp, the piece of the mail is fed through the inversion path 7. Thereafter, the stamp detector 9*a* or 9*b* detects the presence or absence of a stamp on the piece of mail. When the presence of the stamp is detected, this stamp presence signal is applied to the stamper 13*a* or 13*b* to impress a mark on the stamp of the piece of mail just before sorting the mails.

When no stamp is detected by the two stamp detectors 9*a* and 9*b*, the front side of the piece of mail (on which an address is written) is detected by the two addresses position detectors 20*a* and 20*b*. That is, the surface on which many characters are written is determined as the front side surface of the piece of the mail.

The address position (surface information) detector 20*a* or 20*b* also detects the position of a window or a label. In this process, when the address position detector 20*a* detects a mail front, the branch mechanism 50 is actuated so that the piece of mail is fed to the character detector 30*a*; and when the address position detector 20*b* detects a mail front, the branch mechanism 50 is actuated so that the piece of mail is fed to the character detector 30*b*.

Since the front surface of a piece of mail has already been detected by the address position detectors 20*a* and 20*b* and the detected piece of mail is fed to any one of the character detectors 30*a* and 30*b*. The character detector 30*a* or 30*b* detects characters on the front surface of a piece of mail by scanning and quantization. The detected character image signals detected by the character detector 30*a* or 30*b* are stored in the image memory 41. Further, only the character image signals corresponding to the address position signals (window/label signal) are read from the image memory 41 by the address position detector 42 on the basis of the window/label signal detected by the address position detector 20*a* or 20*b*.

The character features (e.g. arrangement order, regularity, size, density, etc.) of the read character image signals are detected by the parameter extractor 44 and discriminated as to printed mail or handwritten mail by comparing the extracted character futures with the stored reference character values by the discriminator 45.

Further, where no window/label signal is detected, the address position detector 42 itself determines an address character area by compressing the entire surface image signals and binarizing the compressed signals. When a character area signal is detected, only the character image signals corresponding to the address area signal are read from the image memory 41 for discrimination.

The pieces of mail thus discriminated are stored into the five sorting boxes 15*a* to 15*e*.

In the above description, the mail processing machine of the present invention has been disclosed with reference to block diagrams (i.e. hardware configuration). In practice, however, the mail processing machine is controlled by the controller 100 provided with a ROM, a ROM, a display unit, a keyboard 101, etc., which is operated in accordance with control programs (i.e. software).

As described above, in the mail processing machine of the present invention, since the surface information (window or label position, quantity of characters, character block position) is first detected and then only the character image signals limited by the surface information are discriminated as to whether the address characters are written in print or handwriting, it is possible to improve the sorting speed of the mail, while reducing the cost of the machine.

What is claimed is:

1. A mail processing machine, comprising:

(a) means for feeding a piece of mail having first and second surfaces;

(b) first detecting means for detecting the presence of a destination mail address on the first surface of the piece of mail, wherein the first detecting means comprises:

first light emitting means for emitting light onto the first surface of the piece of mail for coarse scanning; and first photosensitive means, coupled to the first light emitting means, for detecting light emitted from the first light emitting means and reflected from the piece of mail to obtain destination mail address information;

(c) second detecting means for detecting the presence of a destination mail address on the second surface of the piece of mail, wherein the second detecting means comprises:

second light emitting means for emitting light onto the second surface of the piece of mail for coarse scanning; and second photosensitive means, coupled to the second light emitting means, for detecting light emitted from the second light emitting means and reflected from the piece of mail to obtain destination mail address information;

(d) means for determining a front side of the mail on which the destination mail address is detected to be present according to the presence of one of a destination mail address window, a destination mail address label, and a predetermined number of letters in the destination mail address, wherein the means for determining comprises:

first quantizing means, coupled to the first and second photosensitive means, for quantizing detected destination mail address information in accordance with a first slice level to generate a first destination address position signal indicative of any one of a destination address window and a destination address label;

second quantizing means, coupled to the first and second photosensitive means, for quantizing detected destination mail address information in accordance with a second slice level, lower than the first slice level, to generate a second destination address position signal indicative of destination address character;

third quantizing means coupled to the second detecting means;

first integrating means, coupled to the second quantizing means, for integrating the second destination mail address signal;

second integrating means, coupled to the third quantizing means, for integrating the signal output therefrom; and comparing means, coupled to the second and third integrating means, for comparing the destination signal from the first integrating means with the signal from the second integrating means to determine mail front surface;

(e) third detecting means for detecting the destination mail address on the first surface of the piece of mail, when the first surface is determined as the front side of the mail;

(f) fourth detecting means for detecting the destination mail address on the second surface of the piece of mail, when the second surface is determined as the front side of the mail; and (g) means for recognizing two types of an address including a handwritten address and a printed address and for deciding to which of the two types the destination mail address, detected by one of the third and fourth detecting means, belongs.

2. The mail processing machine of claim 1, which further comprises:

(h) first stamp detecting means for detecting the presence of a postage stamp on a half of the first surface of the piece of mail;

(i) second stamp detecting means for detecting the presence of the postage stamp on the same half of the second surface of the piece of mail;

(j) means for conveying the piece of mail as it is to the first and the second detecting means when one of the first and the second stamp detecting means detects the presence of a postage stamp; and (k) means for reversing the piece of mail upside-down and conveying the piece of mail to the first and the second detecting means when both of the first and the second stamp detecting means fail to detect the presence of a postage stamp.

3. The mail processing machine of claim 1, wherein said third and fourth detecting means each comprises:

(a) means for optically scanning and finely detecting an entire surface image of a piece of mail; and (b) means for quantizing the detected entire surface image signal in accordance with a slice level to generate address character image signals.

4. The mail processing machine of claim 1, wherein said means for recognizing comprises:

(a) storing means for storing mail address character image signals detected by one of said third and fourth detecting means;

(b) destination address position detecting means for detecting a destination mail address area where a destination mail address is written by obtaining an aggregation of one of a plurality of binarized mail address character image signals stored in said storing means, when said determining means detects no destination mail address window and no destination mail address label;

(c) means for detecting destination mail address character lines at the detected destination mail address area on the basis of the mail address character image signals stored in said storing means by checking for an absence of a character image signal arrangement in a specific direction within the destination mail address area;

(d) means for extracting plural character feature parameters of mail address character image signals corresponding to only the destination mail address character lines; and (e) discriminating means, for calculating differences in dispersion of each character feature parameter between a detected value and a reference value, for summing the calculated dispersion differences, for comparing the summed dispersion differences with a predetermined value, and for determining that the detected destination mail address character images are printed characters when the summed dispersion differences are less than the predetermined value and for determining that the detailed destination mail address character images are hand-written characters when the summed dispersion differences are greater than the predetermined value.

5. The mail processing machine of claim 4, wherein said destination mail address position detecting means comprises:

(a) W/L detecting means for detecting a presence or an absence of a destination window/label signal detected by said means for determining a front side of the mail;

(b) compressing means, coupled to said W/L detecting means and said storing means, for compressing destination mail address character image signals stored in said storing means, when said W/L detecting means detects an absence of a destination window/label signal;

(c) address area detecting means for detecting a destination mail address character area on the basis of the compressed destination mail address character image signals; and (d) means for reading mail address character image signals corresponding to only the destination mail address character area corresponding to one of the detected destination window/label signal and the detected destination mail address character area.

6. A mail processing machine, comprising:

(a) means for feeding a piece of mail having first and second surfaces;

(b) first detecting means for detecting the presence of a mail address on the first surface of the piece of mail, including:

first means for emitting light onto the surface of the piece of mail for coarse scanning; and first photosensitive means, coupled to said first light emitting means, for detecting light emitted from said first light emitting means and reflected from the piece of mail to obtain mail address information;

(c) second detecting means for detecting the presence of a mail address on the second surface of the piece of mail, including:

second means for emitting light onto the surface of the piece of mail for coarse scanning; and second photosensitive means, coupled to said second light emitting means, for detecting light emitted from said second light emitting means and reflected from the piece of mail to obtain mail address information;

(d) means for determining a front side of the mail on which the mail address is detected to be present, including:

first quantizing means, coupled to said photosensitive means, for quantizing the detected mail address information in accordance with a first slice level to generate a first address position signal indicative of any one of an address window and an address label;

second quantizing means, coupled to said photosensitive means, for quantizing the detected mail address information signals in accordance with a second slice level, lower than the first slice level, to generate a second address position signal indicative of address characters;

third quantizing means coupled to said second detecting means;

first integrating means, coupled to said second quantizing means, for integrating the second mail address position signal indicative of address characters;

second integrating means, coupled to said third quantizing means, for integrating the signal output therefrom; and comparing means, coupled to said second and third integrating means, for comparing the signal from said first integrating means with the signal with the signal from said second integrating means to determine the mail front surface;

(e) third detecting means for detecting the mail address on the first surface of the piece of mail, when the first surface is determined as the front side of the mail;

(f) fourth detecting means for detecting the mail address on the second surface of mail, when the second surface is determined as the front side of the mail; and (g) means for recognizing two types of an address including a hand-written address and a printed address and for deciding to which of the two types the mail address, detected by one of the third and the fourth detecting means belongs, including:

storing means for storing mail address character image signals detected by one of said third and fourth detecting means;

address position detecting means for detecting a mail address area where a mail address is written by obtaining an aggregation of one of a plurality of binarized mail address character image signals stored in said storing means, when said determining means detects no address window and no address label, including:

W/L detecting means for detecting a presence or an absence of a destination window/label signal detected by said means for determining a front side of the mail;

compressing means, coupled to said W/L detecting means and said storing means, for compressing destination mail address character image signals stored in said storing means, when said W/L detecting means detects an absence of a destination window/label signal;

address area detecting means for detecting a destination mail address character area on the basis of the compressed destination mail address character image signals; and means for reading mail address character image signals corresponding to only the destination mail address character area corresponding to one of the detected destination window/label signal and the detected destination mail address character area;

means for detecting destination mail address character lines at the detected destination mail address area on the basis of the mail address character image signals stored in said storing means by checking for an absence of a character image signal arrangement in a specific direction within the destination mail address area;

means for extracting plural character feature parameters of mail address character image signals corresponding to only the destination mail address character lines; and discriminating means, for calculating differences in dispersion of each character feature parameter between a detected value and a reference value, for summing the calculated dispersion differences, for comparing the summed dispersion differences with a predetermined value, and for determining that the detected destination mail address character images are printed characters when the summed dispersion differences are less than the predetermined value and for determining that the detailed destination mail address character images are handwritten characters when the summed dispersion differences are greater than the predetermined value.

* * * * *

UNITED STATES PATENT AND TRADEMARK OFFICE
CERTIFICATE OF CORRECTION

PATENT NO. : 5,025,475
DATED : June 18, 1991
INVENTOR(S) : Yoshie Okabe

It is certified that error appears in the above-identified patent and that said Letters Patent is hereby corrected as shown below:

On the title page and column 1, line 1

In the title, change "PROCESSING MACHINE" to --MAIL PROCESSING MACHINE--.

Claim 6, column 10, line 50, after "means" delete --with the signal--.

Claim 6, column 10, line 65, after "means" insert --,--.

Signed and Sealed this

Twentieth Day of April, 1993

*Attest:*

MICHAEL K. KIRK

*Attesting Officer*

*Acting Commissioner of Patents and Trademarks*